United States Patent [19]
Iizuka

[11] Patent Number: 5,287,192
[45] Date of Patent: Feb. 15, 1994

[54] SOLID-STATE IMAGER FOR USE WITH TWO DIFFERENT TV SYSTEMS

[75] Inventor: Tetsuya Iizuka, Kanagawa, Japan
[73] Assignee: Sony Corporation, Tokyo, Japan
[21] Appl. No.: 913,369
[22] Filed: Jul. 15, 1992
[30] Foreign Application Priority Data
  Jul. 15, 1991 [JP] Japan ............... 3-201234
[51] Int. Cl.$^5$ ................ H04N 3/14; H04N 5/335
[52] U.S. Cl. ................................. 348/311; 348/294
[58] Field of Search ................ 358/213.28, 213.29, 358/213.23, 213.26, 213.22, 213.11

[56] References Cited
U.S. PATENT DOCUMENTS
4,426,664  1/1984  Nagumo et al. ............... 358/213.29
4,879,601 11/1989  Buck et al. ..................... 358/213.29
4,996,000  2/1991  Nishida et al. ................. 358/213.29

Primary Examiner—Joseph Mancuso
Assistant Examiner—Wendy R. Greening
Attorney, Agent, or Firm—Hill, Steadman & Simpson

[57] ABSTRACT

A CCD imager designed to combine two consecutive lines of signal charges into a signal line to provide a picture signal according to a television system, such as NTSC with an image sensor having a photosensor array, or another television system, such as HDTV or EDTV. When the NTSC mode is selected by a selector, the vertical shift registers are clocked rapidly so that a vertical scan is repeated twice in each horizontal scanning period to reduce the number of scanning lines in half.

6 Claims, 7 Drawing Sheets

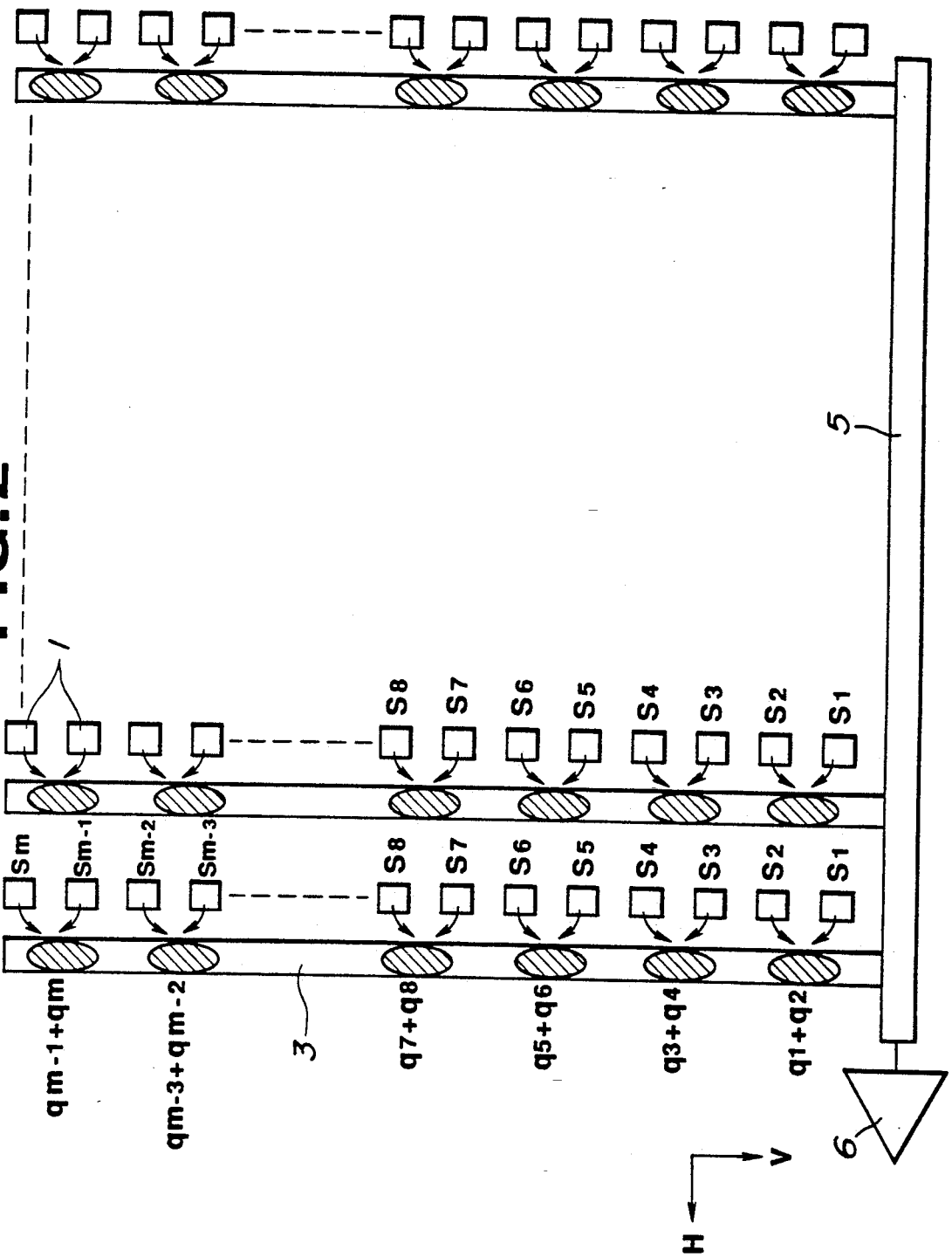

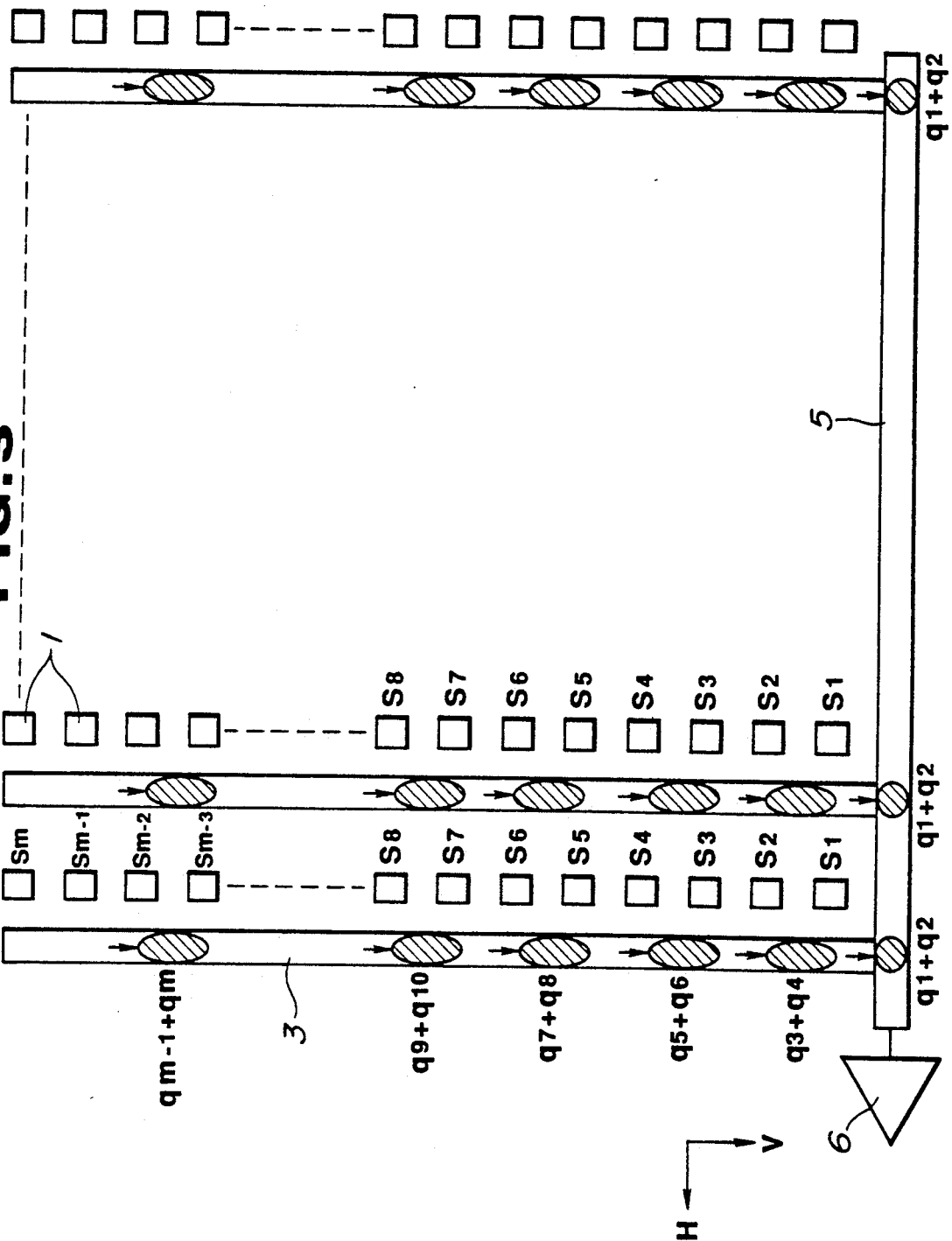

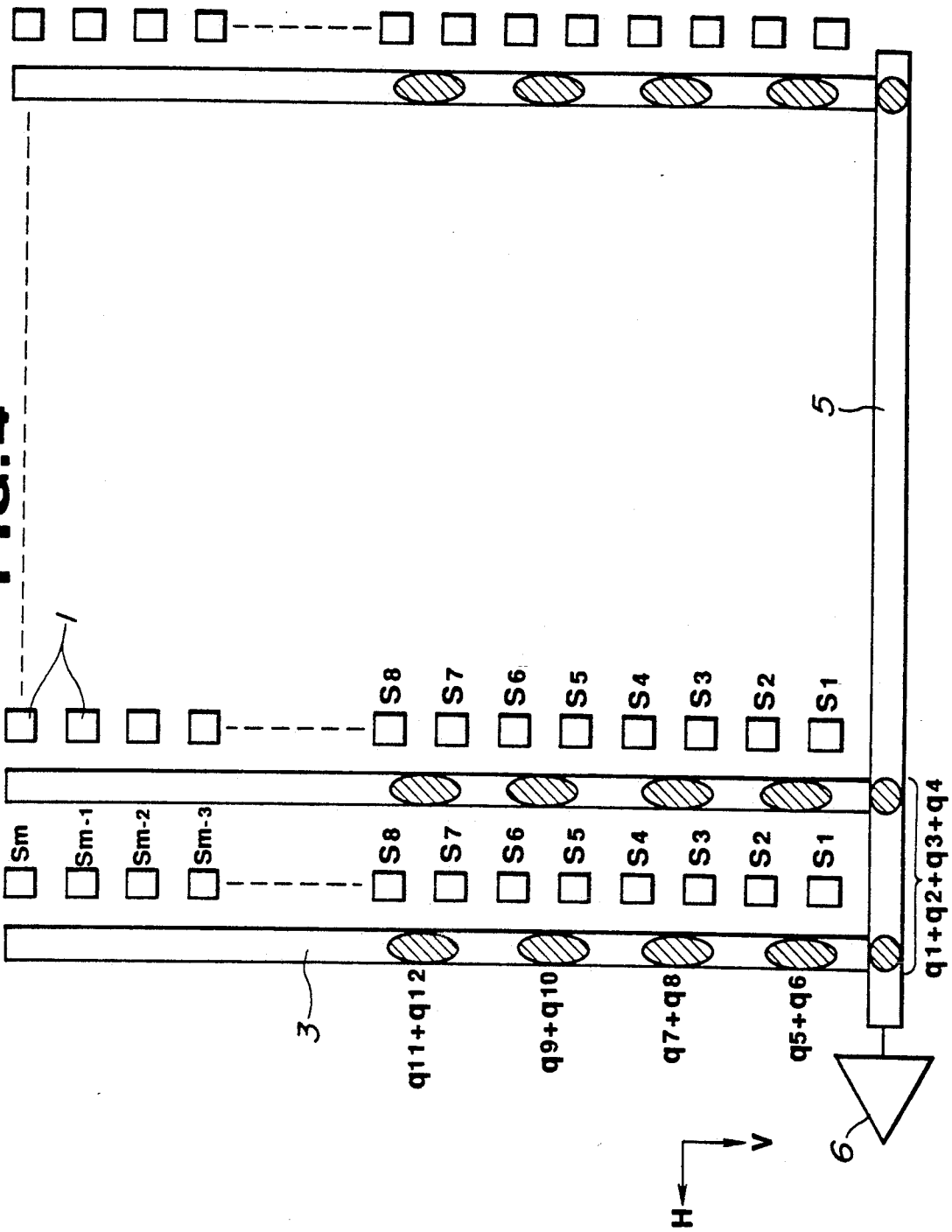

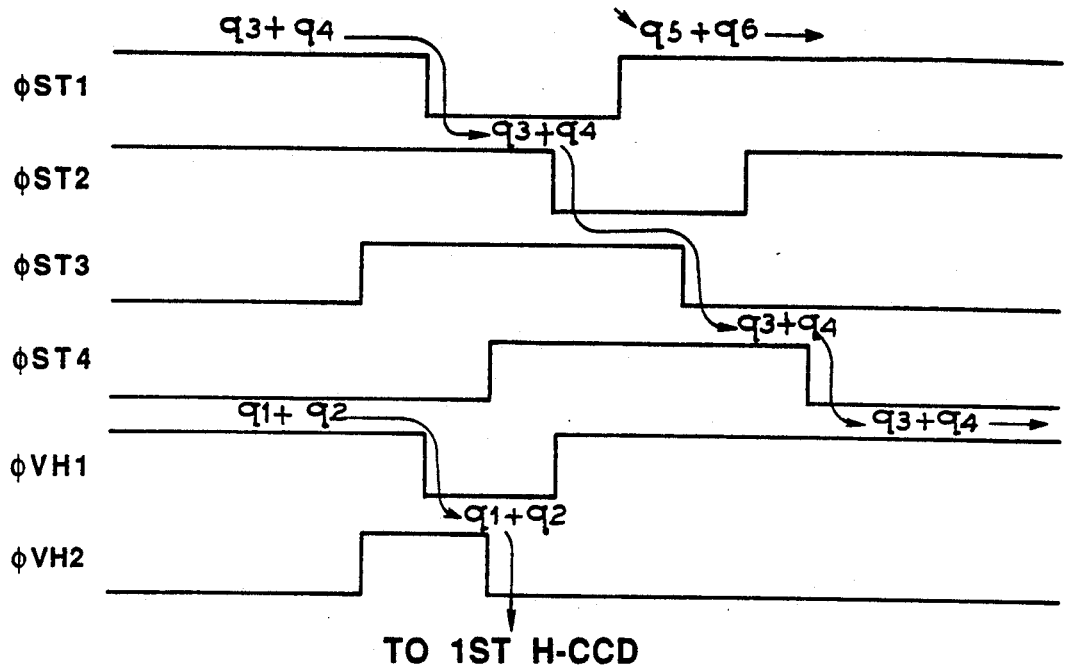
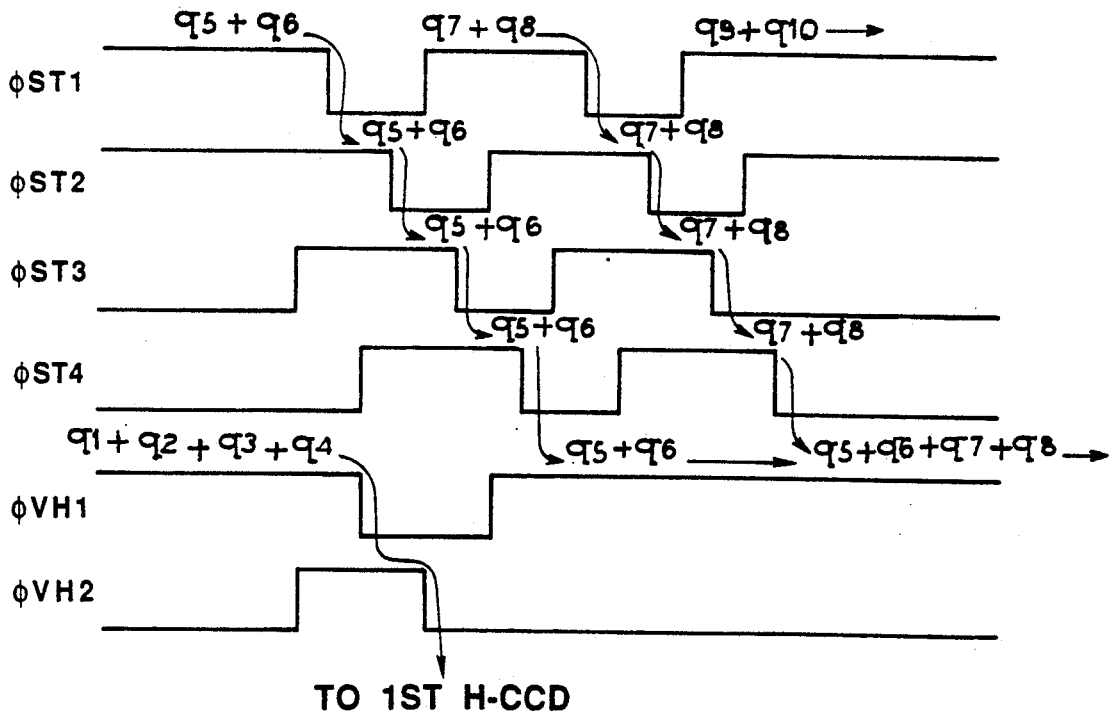

SOLID-STATE IMAGER FOR USE WITH TWO DIFFERENT TV SYSTEMS

BACKGROUND OF THE INVENTION

The present invention relates to solid-state imagers, and more specifically to solid-state imagers fabricated in conformity with the standards of a high picture quality television system.

Presently, Japan, the United States and many other countries employ the NTSC television system using a total of 525 scanning lines. The newly developed high picture quality TV system such as EDTV or HDTV, on the other hand, requires about twice as many lines as the NTSC system. Conventional solid-state imagers having pixel formats corresponding to the NTSC system are utterly incompetent for the EDTV or HDTV. Recently, research and development are being made to realize and improve imagers at the level of definition of the ED or HD system.

New imagers adapted to the EDTV or HDTV system are not readily used for the NTSC system. One way is to convert a picture signal of a new imager into a picture signal of the NTSC system by performing interpolation in the horizontal scanning period with a down converter. This technique, however, cannot provide a video camera capable of producing picture signals of both television systems by itself. In such a state of art, it is required to produce solid-state imagers on two different standards at the cost of production efficiency.

SUMMARY OF THE INVENTION

It is therefore an object of the present invention to provide a solid-state imager having the compatibility between an EDTV or HDTV system and NTSC system.

According to the present invention, a solid-state image sensing device comprises an image sensor and a means for driving the image sensor. The image sensor comprises a photosensitive light receiving section for generating and accumulating signal charges each corresponding to a pixel, a vertical charge transfer section, a horizontal charge transfer section, and an output section. The driving means supplies transfer clocks to the vertical and horizontal transfer sections to control charge motion in these transfer sections. The driving means of the present invention drives the vertical and horizontal transfer sections in such a way as to combine a line of signal charges corresponding to one scanning line with a next line of signal charges corresponding to a next scanning line, to form a new line of signal charges in the horizontal transfer section or a register provided between the vertical transfer section and the horizontal transfer section.

This imaging device can perform field readout operations as follows. The vertical transfer section transfers signal charges corresponding to two pixels to the horizontal transfer section for each horizontal scan in the field readout according to the EDTV or HDTV system. In the case of the NTSC system, the vertical transfer section transfers signal charges corresponding to four pixels to the horizontal section. Therefore, the imaging device can reduce the number of scanning lines by half.

BRIEF DESCRIPTION OF THE DRAWINGS

FIGS. 2 and 3 are schematic views for illustrating a normal field readout process of a solid-state image sensor shown in FIG. 1.

FIG. 4 is a schematic view for illustrating a special field readout operation of the image sensor to halve the number of scanning lines.

FIGS. 8A and 8B are timing charts showing waveforms of 4-phase clocks for vertical CCDs and 2-phase clocks for a VH register shown in FIG. 7, for the normal field readout and the special filed readout.

DETAILED DESCRIPTION OF THE INVENTION

Figure 1:
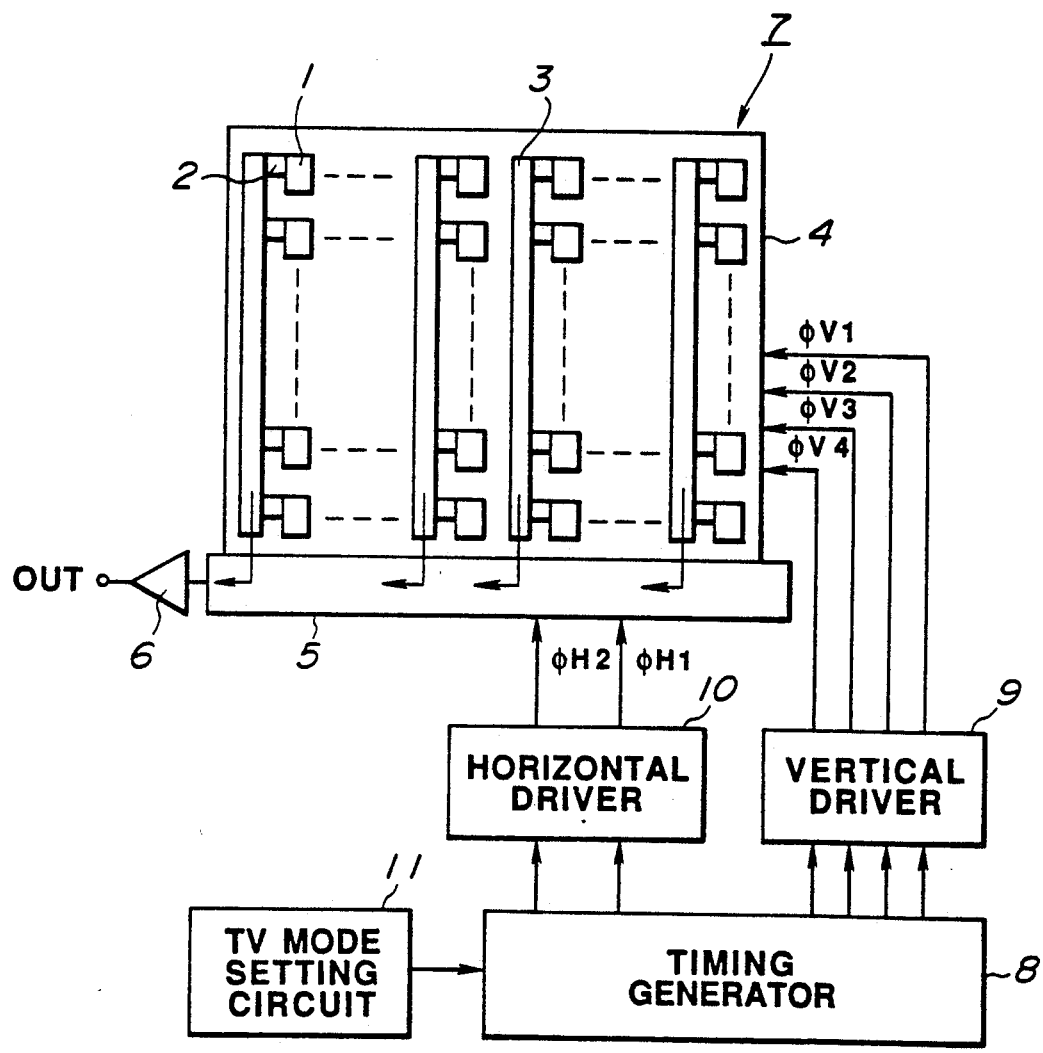
FIG. 1 is a schematic view showing an imaging device according to a first embodiment of the present invention.

FIG. 1 shows a solid-state imaging system according to a first embodiment of the present invention.

This imaging system includes a CCD image sensor 7 which includes an imaging section (or image area) 4, a horizontal CCD shift register 5 and an output section 6. In this example, the sensor 7 is an interline transfer type CCD image sensor.

The imaging section 4 includes a plurality of photosensors 1 and a plurality of vertical CCD shift registers 3. The photosensors 1 are regularly arranged in an array. Each vertical shift register 3 is assigned to a unique one of vertical columns of the photosensor array. Each photosensor 1 is connected with the corresponding vertical shift register 3 by a readout gate 2. The photosensors 1 of this array is enormous in number to meet the standards of a TV system such as ED system or HD system. For example, the photosensors 1 are arrayed to form a format of two million pixels. In this example shown in FIG. 1, the vertical shift registers 3 are 4-phase CCD shift registers driven by four vertical shift clocks $\phi V1$, $\phi V2$, $\phi V3$ and $\phi V4$. Each photosensor 1 converts incident light energy into signal charge corresponding to one pixel, and stores the signal charge. The signal charge is read out through the readout gate 2 into the corresponding vertical shift register 3. The vertical shift registers 3 perform vertical scanning by shifting the photogenerated signal charge packets vertically.

The horizontal CCD shift register 5 receives the signal charge packets in regular sequence from the vertical CCD shift registers 3. In this example, the horizontal shift register 5 is a two phase CCD shift register driven by first and second horizontal shift clocks $\phi H1$ and $\phi H2$. The horizontal shift register 5 scans horizontally by horizontally shifting a series of signal charge packets corresponding to one scanning line.

The output section 6 is connected with an output end of the horizontal shift register 5. The output section 6 detects the signal charge transferred from the horizontal shift register 5, and converts the signal charge to a voltage signal. Furthermore, the output section 6 performs a function of buffer. In this way, the imaging section 4, the horizontal shift register 5 and the output section 6 constitute the interline transfer CCD image sensor 7.

The imaging system shown in FIG. 1 further includes a timing pulse generator 8, a vertical driver 9 and a horizontal driver 10. The timing pulse generator 8 produces the 4-phase vertical clocks $\phi V1 \sim \phi V4$, the 2-phase horizontal clocks $\phi H1$ and $\phi H2$, and other timing pulses. The vertical clocks $\phi V1$, $\phi V2$, $\phi V3$ and $\phi V4$ are applied through the vertical driver 9 to the vertical CCD shift registers 3. The horizontal clocks $\phi H1$ and $\phi H2$ are applied through the horizontal driver 10 to the horizontal CCD shift register 5.

The imaging system of FIG. 1 further includes a TV mode setting circuit (or selector) 11 for alternatively selecting one of the NTSC TV mode and another TV mode such as EDTV or HDTV. For example, the TV mode setting circuit 11 comprises a switch for selecting one of the TV modes. The TV mode setting circuit 11 is connected with the timing pulse generator 8. The setting circuit 11 delivers a mode selection signal indicative of the result of selection to the timing pulse generator 8. In accordance with the mode selection signal of the setting circuit 11, the pulse generator 8 controls the timings of the 4-phase vertical shift clocks $\phi V1 \sim \phi V4$ so as to cause the output section 6 to produce a picture signal in conformity with the selected one of the NTSC TV mode and the EDTV or HDTV mode.

The CCD image sensor 7 of this embodiment is fabricated to suit the EDTV or HDTV mode. Therefore, this image sensor 7 is operated in a normal manner when the EDTV or HDTV mode is selected.

FIGS. 2-4 schematically show operations of the imaging system of this embodiment. These figures show processes of charge motion in the case of field readout.

When the EDTV or HDTV mode is selected with the TV mode setting circuit 11, the CCD image sensor 7 is operated in the normal manner as shown in FIGS. 2 and 3.

The photogenerated signal charge accumulated in each photosensor 1 is transferred, once per field, to the predetermined storage site of the adjacent vertical shift register 3, and mixed with the signal charge of the neighboring pixel in the vertical shift register 3. FIG. 2 shows signal charge packets each of which is the result of addition of signal charges of two adjacent photosensors 1. In FIG. 2, q1, q2, q3, . . . respectively represent signal charges transferred from the photosensors 1 numbered as S1, S2, S3, . . . of each vertical column of the photosensor array.

Then, the first charge packet q1+q2 is transferred from each vertical shift register to the horizontal register 5, and the subsequent signal charge packets q3+q4, q5+q6, . . . are transferred to the respective next storage sites, as shown in FIG. 3. In this way, the horizontal register 5 receives a series of the signal charge packets corresponding to one line in each vertical scan. Then, the horizontal register 5 performs a horizontal scan of one line by shifting the signal charge packets in the horizontal direction. The output section 6 produces the corresponding voltage signal.

After the completion of the horizontal scan of one line, the vertical scan and horizontal scan are repeated until the output (picture) signal of one field is obtained. In this way, the CCD image sensor 7 performs the normal field readout operation.

When the setting circuit 11 selects the NTSC TV mode, the imaging system controls charge motion as follows.

Each vertical shift register 3 receives photogenerated signal charges from the photosensors 1 of the adjacent column once in each field, collect the signal charges of the photosensors 1 into signal charge packets each of which is the sum of signal charges of two neighboring pixels, and completes one vertical scan by transferring the charge packets in the same manner as shown in FIGS. 2 and 3.

After the first vertical scan, however, the imaging system does not shift the signal charge packets in the horizontal register 5, but performs the next vertical scan to shift the next signal charge packet q3+q4 to the horizontal shift register 5. Therefore, the first signal charge packets q1+q2 and the second signal charge packet q3+q4 from each vertical shift register 3 are mixed and added up together into a larger signal charge packet q1+q2+q3+q4 in the horizontal shift register 5, as shown in FIG. 4.

Thereafter, the horizontal shift register 5 performs the horizontal scan of one line by shifting a series of the signal charge packets each corresponding to four pixels in the horizontal direction, and the output section 6 produces the output signal corresponding to one line. After the horizontal scan, the imaging system performs the subsequent two vertical scan and the next horizontal scan, and produces an output signal corresponding to one field by further repeating a set of two vertical scans and one horizontal scan. In this way, the CCD image sensor 7 can produce not only picture signals according to the EDTV or HDTV mode but also picture signals according to another TV mode such as NTSC mode.

Figure 5A:
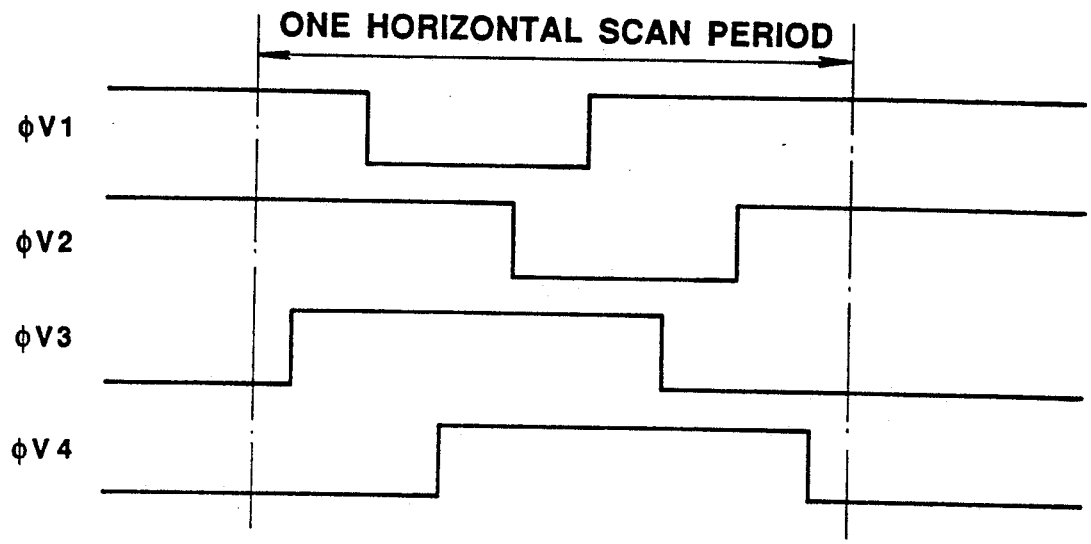
FIGS. 5A and 5B are timing charts showing waveforms of 4-phase vertical drive clocks for the normal field readout and the special field readout.
Figure 5B:
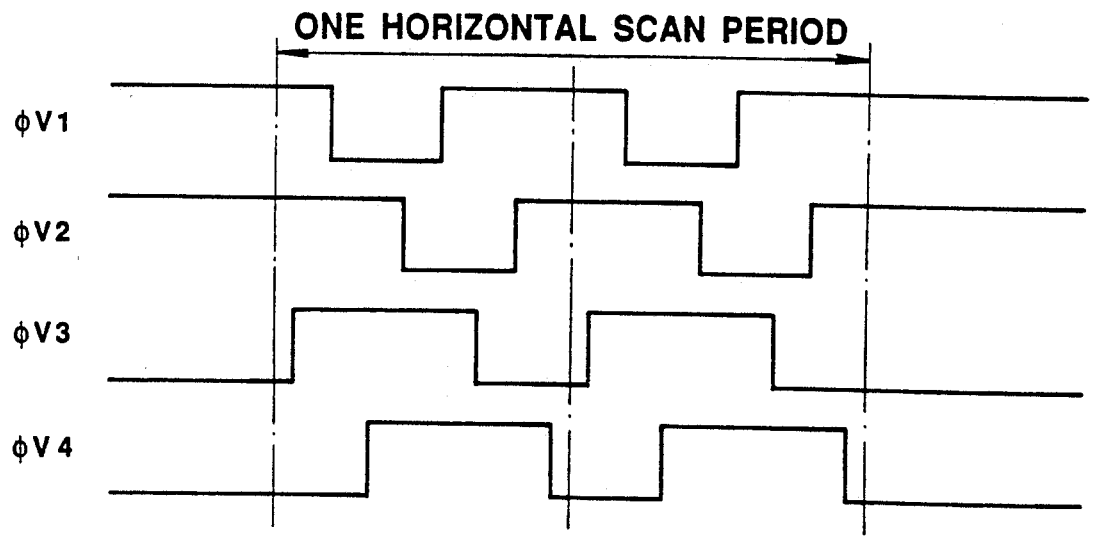
Figure 6:
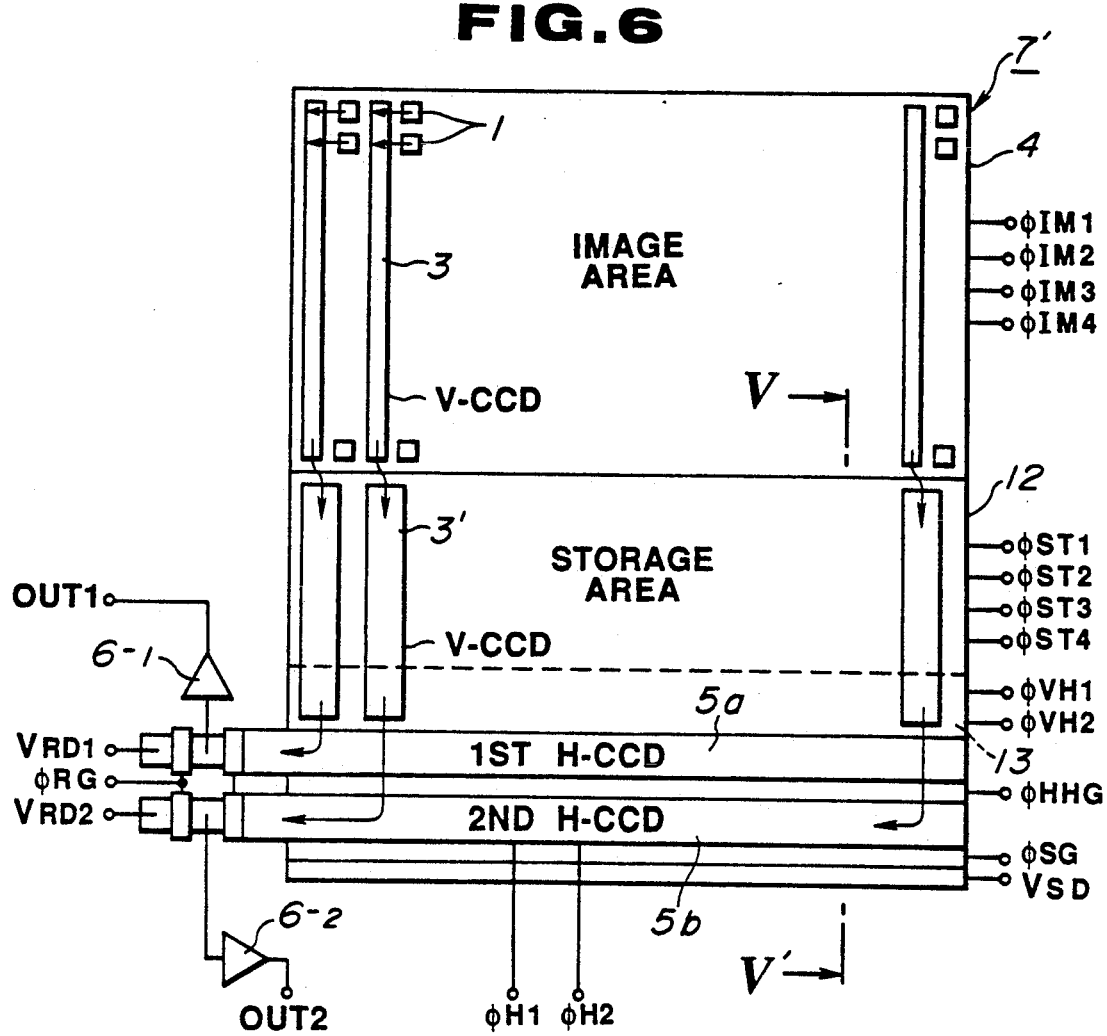
FIG. 6 is a schematic view showing a CCD image sensor according to a second embodiment of the present invention.

FIGS. 5 and 6 show timing schedules of the 4-phase vertical shift clocks for the field readout in the EDTV or HDTV mode and the NTSC TV mode, respectively. In the field readout of the EDTV or HDTV mode, this system transfers a signal charge packet corresponding to two pixels from the vertical CCD shift registers 3 to the horizontal CCD shift register 5 for each horizontal scan. In the field readout of the NTSC TV mode, on the other hand, the system transfers signal charge packets corresponding to four pixels from each vertical shift register 3 to the horizontal register 5 for each horizontal scan. In the case of the EDTV or HDTV mode, this system performs a cycle of ordered changes in the 4-phase vertical shift clocks $\phi V1$, $\phi V2$, $\phi V3$ and $\phi V4$ once in one horizontal scanning period H, as shown in FIG. 5. In the case of the NTSC TV mode, the system repeats the same cycle of ordered changes twice in one horizontal scanning period H. When the NTSC TV mode is selected, each vertical register 3 repeats a set of ordered actions twice in one horizontal scanning period while the set of the ordered actions is performed only once in the case of the EDTV or HDTV mode. In this way, this system can reduce the number of the scanning lines to half by adding a signal charge packet corresponding to two pixels and a next signal charge packet corresponding to two pixels in the horizontal CCD shift register 5.

When the HDTV system using 1125 scanning lines is adopted as the TV mode, then this imaging system can reduce the number of scanning lines to 562.5 (1125/2). Therefore, this imaging system can use 525 lines among 562.5 lines to produce picture signals of the NTSC system.

Some lines and some pixels in each line becomes unnecessary with the change of the number of scanning lines and a change of the aspect ratio (16:9→4:3, for example). It is possible to dispose of the signal charge packets of these unwanted pixels, by providing an unwanted charge eliminating section (not shown) in the CCD image sensor 7. In this case, the eliminating section includes an unwanted charge sweeping gate connected with the horizontal CCD 5, and an unwanted charge sweeping drain. The unwanted charge eliminating section is controlled to sweep out signal charges existing in the horizontal shift register 5 at an appropriate timing.

Figure 7:
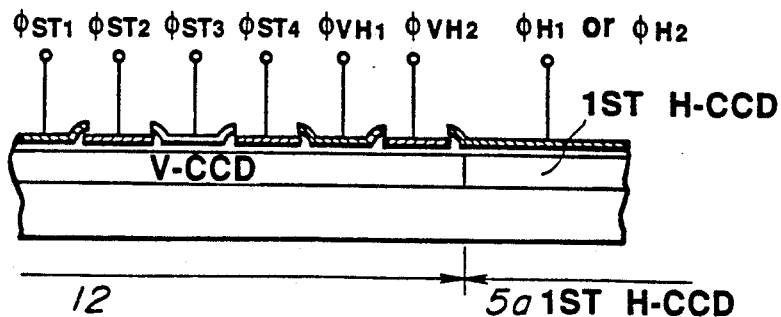
FIG. 7 is a sectional view taken across a line V—V' in FIG. 6.

FIGS. 6 and 7 show a CCD image sensor 7' according to a second embodiment of the present invention. The image sensor 7' shown in FIG. 6 is an FIT CCD image sensor.

The image sensor 7' has an image area 4, a storage area 12, a 2-channel horizontal transfer section including first and second horizontal CCD shift registers 5a and 5b, and a VH register section 13. The first horizontal shift register 5a receives signal charge packets from odd-numbered vertical CCD shift registers. The second horizontal shift register 5b receives signal charge packets from even-numbered vertical CCD shift registers. The VH register section 13 is provided between the first horizontal CCD shift register 5a, and vertical CCD shift registers 3' of the storage area 12, as shown in FIGS. 6 and 7. The VH register section 13 is designed to store signal charge packets transferred from the vertical CCD shift registers 3' for 1H period.

The vertical CCD shift registers 3' of the storage area 12 are driven by 4-phase clocks $\phi$ST1, $\phi$ST2, $\phi$ST3 and $\phi$ST4. The VH register 13 shown in FIG. 7 has a two-phase structure, and is driven by 2-phase clocks $\phi$VH1 and $\phi$VH2. FIG. 8A shows waveforms of these clocks in the case of the field readout of the EDTV or HDJV mode, and FIG. 8B shows waveforms for the field readout of the NTSC TV mode. The image area 4 is driven by 4-phase clocks $\phi$IM1, $\phi$IM2, $\phi$IM3 and $\phi$IM4.

In the normal operation of the imaging system according to the present invention, a photogenerated signal charge packet is transferred from a final storage location in a first transfer section such as a vertical shift register, to a first storage location in a second transfer section such as a horizontal shift register after a previous signal charge packet has been shifted from the first location to a second location of the second transfer section. In the special operation, the signal charge packet is transfered to the first location of the second transfer section while the previous charge packet remains in the first location. In the second embodiment shown in FIG. 6, it is possible to consider that the second transfer section comprises the HD register section 13 and the horizontal registers 5a and 5b.

It should be understand that various changes and modifications to the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

What is claimed is:

1. An imaging system comprising:
   a photosensitive imaging section;
   a first charge transfer section for receiving signal charge from said imaging section, said first charge transfer section comprises a first vertical shift register for transferring signal charges in a vertical direction from one storage location to a final storage location;
   a second charge transfer section for receiving the signal charges from said first charge transfer section, said second charge transfer section comprises a first horizontal shift register for transferring the signal charges in a horizontal direction;
   an output section for receiving the signal charges from said second transfer section and generating voltage signals;
   a selector section for producing one of a first TV mode selection signal and a second TV mode selection signal; and
   a driver section for driving said first and second transfer sections to control charge motion, said driver section being connected with said selector section, said driver section driving said first vertical shift register in a first driving mode to transfer a signal charge from the final storage location of said first vertical register to a first storage location of said second transfer section after said second register section has transferred a previous signal charge from said first storage location to a next storage location when said first TV mode selection signal is present, and in a second driving mode to transfer a signal charge from said final storage location of said first transfer section to said first storage location of said second transfer section while a previous signal charge remains in said first storage location when said second TV mode selection signal is present.

2. An imaging system according to claim 1 wherein said first horizontal register comprises said first storage location of said second transfer section, so that two signal charges are mixed in said horizontal register.

3. An imaging system according to claim 2 wherein said imaging section, said first and second transfer section and said output section constitute an interline transfer CCD image sensor.

4. An imaging system according to claim 1 wherein said second transfer section further comprises a VH shift register for transferring signal charges from said vertical shift register to said horizontal shift register, and said VH shift register comprises said first storage location.

5. An imaging system according to claim 4 wherein said imaging section, first and second transfer section and output section constitute a frame interline transfer CCD image sensor.

6. A solid-state image sensing device for use with two different television systems comprising:
   an image sensor including a photosensitive light receiving section for generating signal charges each corresponding to a pixel, a vertical transfer section for receiving the signal charges from said light receiving section and transferring the signal charges in a vertical direction, a horizontal transfer section for receiving the signal charges from the vertical transfer section and transferring the signal charges in a horizontal direction, and an output section for detecting the signal charges transferred from the horizontal transfer section;
   a selecting means for selecting one of first and second TV modes; and
   a driving means for driving said vertical transfer section and said horizontal transfer section so as to combine a line of signal charges corresponding to one scanning line of signal charges with a next line of signal charges corresponding to a next scanning line to form a new scanning line of signal charges in one of said horizontal transfer section or register provided between said vertical transfer section and said horizontal transfer section when the first TV mode is selected by said selecting means; and for driving said vertical transfer section and said horizontal transfer section so as to isolate a line of said signal charges corresponding to one scanning line of signal charges from a next line of signal charges corresponding to a next scanning line to form separate scanning lines of signal charges in one of said horizontal transfer section or said register when the second TV mode is selected by said selecting means.

* * * * *